United States Patent
Layton et al.

(10) Patent No.: US 6,785,827 B2
(45) Date of Patent: Aug. 31, 2004

(54) SYSTEM FOR DETERMINING SERVERS POWER SUPPLY REQUIREMENT BY SAMPLING POWER USAGE VALUES THEREOF AT A RATE BASED UPON THE CRITICALITY OF ITS AVAILABILITY

(75) Inventors: Jeffrey S. Layton, Round Rock, TX (US); Reynolds R. Macnary, Pflugerville, TX (US); David L. Moss, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 608 days.

(21) Appl. No.: 09/726,778

(22) Filed: Nov. 29, 2000

(65) Prior Publication Data

US 2002/0066045 A1 May 30, 2002

(51) Int. Cl.[7] .......................... G06F 1/28; G06F 15/173; H02J 3/00; G05D 11/00
(52) U.S. Cl. ....................... 713/300; 709/223; 709/224; 307/29; 307/126; 700/286
(58) Field of Search .............................. 395/750, 182.2; 713/340, 320, 330, 300; 700/295; 364/528; 307/29, 64; 326/9; 320/43; 323/269; 702/107

(56) References Cited

U.S. PATENT DOCUMENTS

| | | | |
|---|---|---|---|
| 5,629,605 A | 5/1997 | Lavan et al. | |
| 5,668,417 A | 9/1997 | Wiscombe et al. | |
| 5,672,958 A | 9/1997 | Brown et al. | |
| 5,842,027 A * | 11/1998 | Oprescu et al. | 713/300 |
| 5,909,583 A | 6/1999 | Hayes et al. | |
| 5,983,357 A * | 11/1999 | Sun | 713/324 |
| 6,018,690 A * | 1/2000 | Saito et al. | 700/295 |
| 6,040,982 A | 3/2000 | Gandre et al. | |
| 6,182,232 B1 * | 1/2001 | Klein | 713/340 |
| 6,208,520 B1 | 3/2001 | Schmitt | |
| 6,504,266 B1 * | 1/2003 | Ervin | 307/29 |
| 6,549,867 B1 * | 4/2003 | Smith | 702/107 |
| 6,594,771 B1 * | 7/2003 | Koerber et al. | 713/330 |

FOREIGN PATENT DOCUMENTS

JP 02000284863 A * 10/2000 ............. G06F/1/26

* cited by examiner

Primary Examiner—Thomas Lee
Assistant Examiner—Chi Whan Chung
(74) Attorney, Agent, or Firm—Haynes and Boone, LLP

(57) ABSTRACT

A system and method for determining power supply requirements for a plurality of servers in an information network that includes a system management bus coupled to provide information on power being utilized by the servers during operation. The information from the system management bus is provided to program instructions that provide power usage values indicative of the power being utilized by the servers, determine the maximum value of the power usage values, and determine power supply requirements based on the maximum power usage. The power supply requirements include operating power and/or redundant power requirements. A warning signal is generated if adequate power is not available to the servers.

16 Claims, 2 Drawing Sheets

SYSTEM FOR DETERMINING SERVERS POWER SUPPLY REQUIREMENT BY SAMPLING POWER USAGE VALUES THEREOF AT A RATE BASED UPON THE CRITICALITY OF ITS AVAILABILITY

BACKGROUND OF THE INVENTION

1. Field of the Invention

This invention generally relates to servers for accessing and storing information from an information network. More specifically, this invention relates redundant power supply management for server systems.

2. Description of the Related Art

There is currently an ever-increasing need to access computerized information networks, such as the Internet. Access providers utilize scalable networks of computer systems, known as server farms, to interface with client computers on the front end, and to access information on behalf of the client from other computer systems on the back end.

Front-end server farms are scaleable by adding or removing modular server systems. Often, the server modules are inserted side-by-side in a rack that includes one or more external power supplies for the server systems. To provide high availability, one or more redundant power supplies are included to deliver power in the event of a power supply failure. That is, if one power supply fails, one or more of the redundant power supplies takes the load without interrupting service.

In known systems, redundancy is commonly achieved by configuring the server farm with an extra power supply. The power output from more than one power supply is bussed through a current sharing circuit such that if one supply fails, enough power is still available on the power bus to effectively power the system.

To provide redundancy, server systems are typically configured with n+1 power supplies, where n is the number of power supplies required to provide power for the maximum system configuration. For example, a scaleable server system may be designed to include from 1 to 4 processors, 3 storage drives, and 3 power supplies (2+1) that supply a total of 825 watts (3×275 watts). When fully populated, the server system requires 550 watts or less, leaving a spare 275 watts of redundant power. It is, however, possible that the system may be configured with fewer processors and/or disk drives. In this situation, 2 power supplies may be adequate to provide redundancy, with the third power supply being added if and when more components are added to the system. Cost saving may be realized by installing only the number of power supplies necessary to operate the server system while still achieving redundancy and high availability.

It is therefore highly desirable to provide a server system that is capable of determining the power required to supply adequate power to the components as well as to provide redundancy in the event of a failure. It is also desirable for the server system to provide this requirement to the user. It is further desirable for the server system to be able to revise power supply requirements when components are added or removed from the server system.

SUMMARY OF THE INVENTION

The present invention provides a system and method that is capable of determining power requirements based on the hardware configuration. A system management bus is coupled to the servers to provide information on power being utilized by the servers during operation. The information from the system management bus is provided to program instructions that provide power usage values indicative of the power being utilized by the servers. The program instructions further determine the maximum value of the power usage values, and determine power supply requirements based on the maximum power usage. The power supply requirements include operating power and/or redundant power requirements.

One feature of the present invention is that it generates a warning signal if adequate power is not available to the servers. This includes operating power and/or redundant power.

Another feature of the present invention is that it detects changes in hardware components in the servers, and determines revised operating and/or redundant power supply requirements when changes are made in the hardware components.

Another feature of the present invention is a set of averaging program instructions to generate a running average of the power usage values. A new running average of the power usage values is determined when a change in the hardware components is detected in the servers.

The present invention advantageously provides a system and method that may be used to accurately determine power supply requirements, so that only as many power supplies as are necessary to achieve the level of redundancy desired by an operator may be included in the system. The present invention provides indications of when a power supply may be added or removed to maintain the level of redundancy desired. This saves cost and complexity, and improves operating reliability.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

A user that wishes to access information on information network 110 typically has a client workstation 112 that executes application programs such as a browser and an electronic mail program. Workstation 112 establishes a communication link with servers 118, 120, 122 through network interface 114. Various communications links may be utilized, such as a dial-up wired connection with a modem, a direct link such as a T1, ISDN, or cable line, a wireless connection through a cellular or satellite network, or a local data transport system such as Ethernet or token ring over a local area network. Accordingly, network interface 114 includes networking equipment that is suitable to support the communication link being utilized.

One or more servers 118, 120, 122 may provide services such as world wide web hosting, interface to e-commerce sites, network services such as file sharing, mail services, and/or other services. Servers 118, 120, 122 include one or more data processors, network interfaces, and data storage devices as required to transmit and data receive data. A group of servers 118, 120, 122 are often placed in a rack and share power supplies, cooling fans, and other equipment. Power supplies may be co-located in the rack, or located centrally in a separate enclosure.

Figure 1:
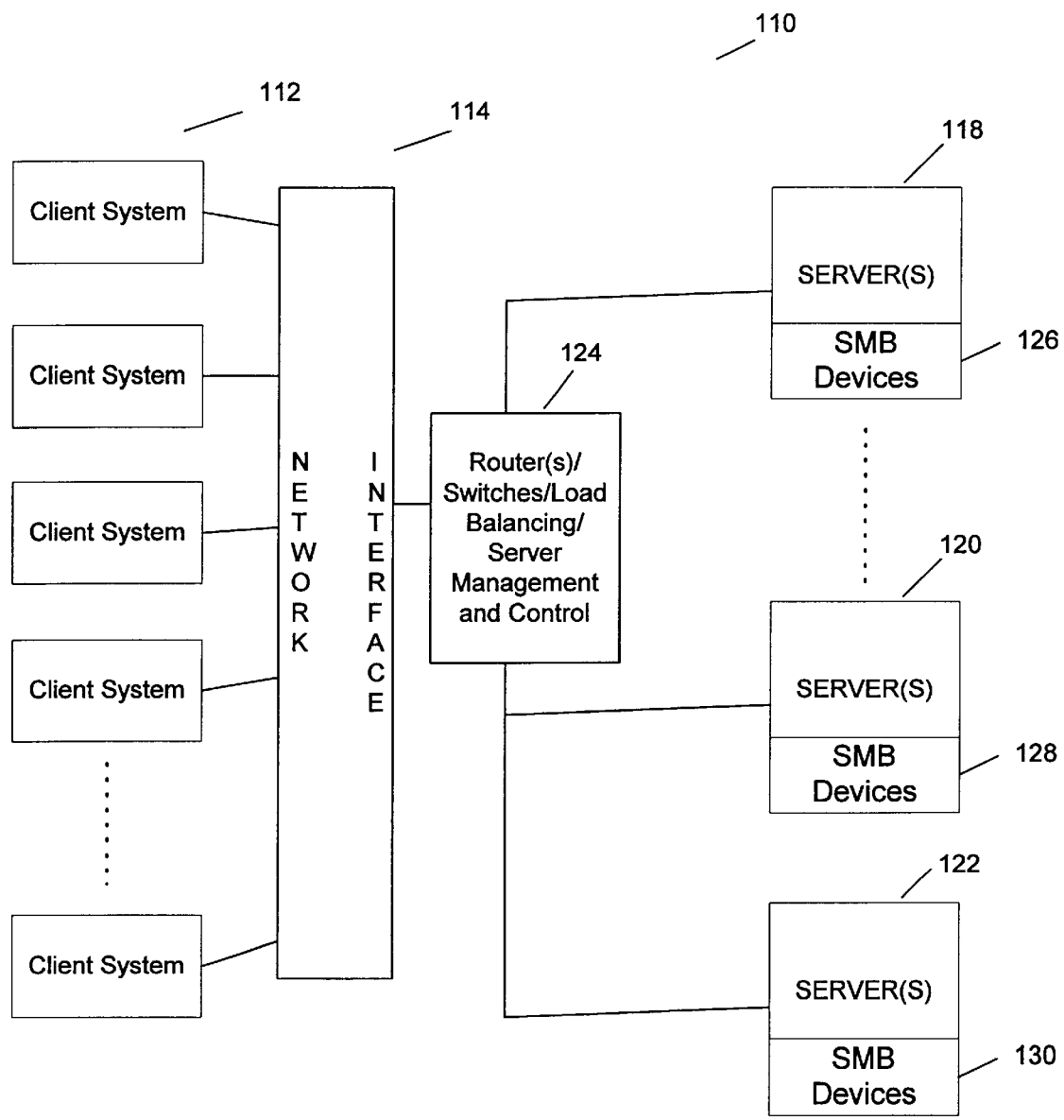
FIG. 1 is a block diagram of an example of a computerized information network with which the present invention may be utilized.

Data transfer between client workstations 112 and servers 118, 120, 122 is managed by routers, switches, load balancers, and server management and control facilities, referred to collectively as management and control 124. While management and control facilities 124 are shown collectively in FIG. 1, they may be implemented on standalone computer systems which are networked with one another.

Management and control facilities 124 provide fail-over capabilities. For example, if server 122 fails, the workload is distributed to one or more of the remaining servers 118, 120, 122, thereby avoiding interruption of services. Management and control facilities 124 may also mirror data storage devices in servers 118, 120, 122 to prevent downtime in the event one or more disks fail or are taken offline. If the combined capacity for servers 118, 120, 122 is insufficient for projected traffic, one or more additional servers may be added. Management and control facilities 124 also include features to redistribute tasks in the event one or more servers 118, 120, 122 go offline due to failure or scheduled maintenance, to install and update databases, and to protect information on servers 118, 120, 122 from unauthorized access.

Management and control facilities 124 balance the load on servers 118, 120, 122, using routers to distribute traffic over a switched network backbone coupled to servers 118, 120, 122. Switches, routers, and load balancing modules are readily available commercially from a number of suppliers.

Server management and control facilities 124 receive information via a system management bus, or equivalent bus, as known in the art. The system management bus (SMB) is connected to SMB devices 126, 128, 130 that provide signals representing operating parameters of various devices in servers 118, 120, 122. Examples of SMB devices include thermal sensors, voltage/current monitoring circuits, fan monitoring circuits, control panel consoles for displaying the status of the disk drives, and power supply monitors for monitoring and reporting the status of the power supplies. The status of the power supply may also include the amount of power being used to operate servers 118, 120, 122. When a power supply fails in server 118, 120, or 122, a warning is issued to alert an operator or other user that server power is in an non-redundant state. The SMB parameters may be displayed on a control panel, monitor, or other device. Audio and/or visual warnings may be issued when parameters fall outside of a predetermined tolerance range or a failure occurs.

Figure 2:
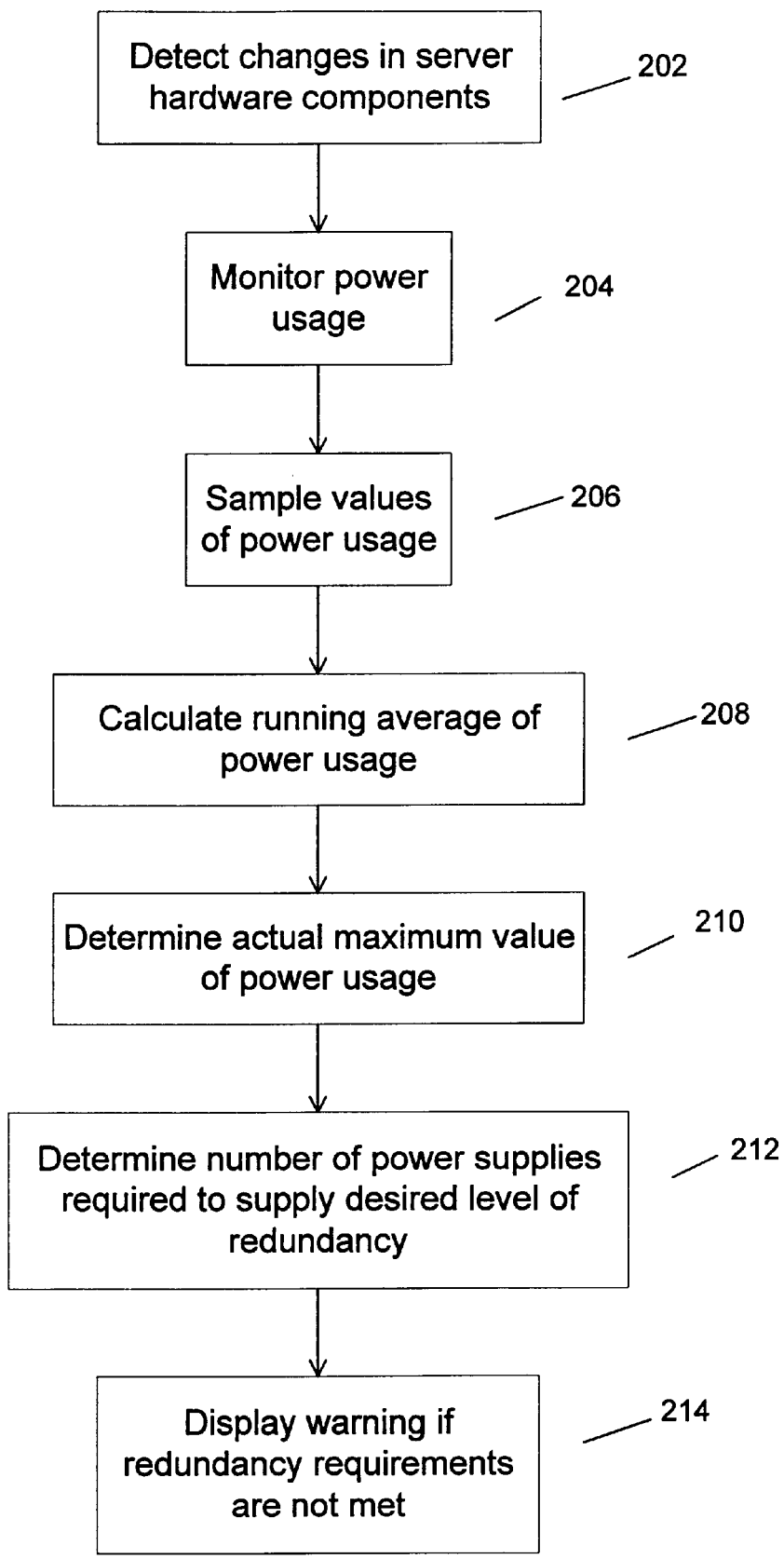
FIG. 2 is a flowchart of a method for determining power requirements for a group of servers in an information network in accordance with the present invention.

Referring to FIG. 2, a flowchart of a method for determining power requirements and issuing an alert when power supplies may be added or removed to meet power redundancy requirements. Process 202 determines hardware components included in servers 118, 120, 122, and whether any changes have been made which would alter power requirements. This determination is used in later processes as described below. Process 204 monitors power usage and provides input values to process 206, which periodically samples and stores the values of power usage. The rate at which the values of power usage are sampled is based on the criticality of server availability and the rate at which process 204 supplies input values to process 206. For example, samples may be stored every predetermined fraction of a second, or every second, minute, hour, or longer, time period.

Process 208 determines a running average of power usage with the sample values stored in process 206. The average is determined one of several known statistical formulas for calculating an average, such as the mean, median, and mode averages. When the hardware configuration of one or more of servers 118, 120, 122 has changed, this average value may be cleared, so that the average value reflects the power usage of the new configuration of the server.

Process 210 determines the maximum value of power usage using the values stored in process 206. When process 210 receives a new power usage value, it compares it to the current maximum value. If the new power usage value is larger, it replaces the current maximum value of power usage.

Process 212 uses the maximum value of power usage to determine the number of power supplies required to supply the desired level of redundancy. To make this determination, the maximum value of power usage from process 210 is divided by the power provided by one power supply. If a fractional result is obtained, it may be rounded up, depending on the margin desired. The result may be supplied directly to users, and the users may determine the number of additional power supplies to add to meet redundancy requirements, Alternatively, or one or more additional power supplies may be added to provide the number of power supplies required to reach the desired level of redundancy, according to a predetermined number or formula supplied by the user.

If the number of power supplies currently available to supply power to servers 118, 120, 122 does not meet redundancy requirements, process 214 issues a warning signal that may be used to alert the operator of the need to add or remove one or more power supplies. The operator alert may be implemented on the front-panel indicators on servers 118, 120, 122, an associated storage device, power supply, or to a system console that is part of management and control facilities 124. The indicator may be one or more light emitting diodes (LEDs), or a numeric read-out that indicates the amount of redundancy or margin available. The alert Advantageously, the present invention may be utilized to analyze power supply requirements whether the power supplies are co-located with servers 118, 120, 122, or located in central power system remote from servers 118, 120, 122. Similarly, the present invention may be implemented as part of management and control facilities 124, or separately as a standalone utility.

The present invention allows power requirements to be determined for operation with minimum power required and/or with redundant power. A power system may be scaled by adding or removing power supplies according to changes in the hardware configuration of one or more servers 118, 120, 122. Each time components are added or removed, the present invention provides information on how close the servers 118, 120, 122 are to requiring a new power supply, or when a power supply may be removed. The present invention may also be added as a feature in known "rack configuring" tools to forecast the number of power supplies to include in a system, given a set of known components in servers 118, 120, 122.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A system for determining power supply requirements for a plurality of servers in an information network, the system comprising:

a system management bus coupled to provide information on power being utilized by the servers during operation;

first program instructions to provide sampled power usage values indicative of the power being utilized by the servers, the power usage values being sampled at a rate based on the criticality of server availability;

second program instructions to determine the maximum power usage from the power usage values; and third program instructions to determine power supply requirements based on the maximum power usage.

2. The system of claim 1, further comprising:

fourth program instructions to generate a warning signal if adequate power is not available to the servers.

3. The system of claim 1, further comprising:

change detection program instructions to detect changes in hardware components in the servers.

4. The system of claim 1, further comprising:

averaging program instructions to generate a running average of the power usage values.

5. The system of claim 1, further comprising:

fourth program instructions to determine redundant power supply requirements based on the maximum power usage.

6. The system of claim 1, further comprising:

change detection program instructions to detect changes in hardware components in the servers; and fourth program instructions to determine power supply requirements when changes are made in the hardware components.

7. The system of claim 1, further comprising:

change detection program instructions to detect changes in hardware components in the servers; and fourth program instructions to determine redundant power supply requirements when changes are made in the hardware components.

8. The system of claim 1, further comprising:

change detection program instructions to detect changes in hardware components in the servers; and averaging program instructions to generate a new running average of the power usage values when a change in the hardware components is detected in the servers.

9. A method for determining power supply requirements for a plurality of servers in an information network, the method comprising:

coupling a system management bus to provide information on power being utilized by the servers during operation;

generating sampled power usage values indicative of the power being utilized by the servers, the power usage values being sampled at a rate based on the criticality of server availability;

determining the maximum power usage from the power usage values; and determining power supply requirements based on the maximum power usage.

10. The method of claim 9, further comprising:

generating a warning signal if adequate power is not available to the servers.

11. The method of claim 9, further comprising:

detecting changes in hardware components in the servers.

12. The method of claim 9, further comprising:

generating a running average of the power usage values.

13. The method of claim 9, further comprising:

determining redundant power supply requirements based on the maximum power usage.

14. The method of claim 9, further comprising:

detecting changes in hardware components in the servers; and determining power supply requirements when changes are made in the hardware components.

15. The method of claim 9, further comprising:

detecting changes in hardware components in the servers; and determining redundant power supply requirements when changes are made in the hardware components.

16. The method of claim 9, further comprising:

detecting changes in hardware components in the servers; and generating a new running average of the power usage values when a change in the hardware components is detected in the servers.

* * * * *